(12) United States Patent
Inazawa et al.

(10) Patent No.: US 6,379,845 B1
(45) Date of Patent: Apr. 30, 2002

(54) CONDUCTIVE POROUS BODY AND METALLIC POROUS BODY AND BATTERY PLATE BOTH PRODUCED BY USING THE SAME

(75) Inventors: Shinji Inazawa; Masatoshi Majima, both of Osaka; Ayao Kariya, Shinminato, all of (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/541,619

(22) Filed: Apr. 3, 2000

(30) Foreign Application Priority Data

Apr. 6, 1999 (JP) .............................. 11-098988

(51) Int. Cl.⁷ ................................ H01M 4/80
(52) U.S. Cl. ..................... 429/235; 429/209; 429/223; 429/236; 29/2
(58) Field of Search .............................. 429/209, 223, 429/235, 236; 29/2

(56) References Cited

U.S. PATENT DOCUMENTS 6,117,592 A * 9/2000 Hoshino et al. ............ 429/235

OTHER PUBLICATIONS

"Use of Ti(III) Complexex To Reduce Ni, Co, and Fe in Water Solutions" J. Phys. Chem., vol. 100, No. 50, 1996, 19632–19635.

"Use of Ti(III) Complexex To Reduce Ni, Co, and Fe in Water Solutions" J. Phys. Chem., vol. 100, No. 50, 1996, 19632–19635 (No month available).

* cited by examiner

Primary Examiner—Carol Chaney
Assistant Examiner—Dah-Wei Yuan
(74) Attorney, Agent, or Firm—McDermott, Will & Emery (57) ABSTRACT

A conductive porous body that has a conductive layer almost free from impurities and that enables a metallic porous body having extremely low resistance to be produced with high productivity and production efficiency, and a metallic porous body and a battery plate both produced by using the conductive porous body. The conductive porous body has a nickel conductive layer formed on the surface of the framework of a plastic porous body having a continuous-pore structure. The conductive layer is formed by the deposition of nickel from an aqueous solution containing nickel compounds with the use of a reducing agent containing titanium compounds. The metallic porous body can be obtained by forming a continuous metal-plated layer on the surface of the framework of the conductive porous body. The metal-plated layer is formed by electroplating with the conductive porous body serving as the cathode. The battery plate consists mainly of the metallic porous body.

16 Claims, 3 Drawing Sheets

CONDUCTIVE POROUS BODY AND METALLIC POROUS BODY AND BATTERY PLATE BOTH PRODUCED BY USING THE SAME

BACKGROUND OF THE INVENTION

1. Field of the Invention

The present invention relates to an electrically conductive porous body obtained by giving electrical conductivity onto the surface of the framework of a plastic porous body having a continuous-pore structure, to a metallic porous body produced by using the conductive porous body as an intermediate material, which metallic porous body is especially suitable for a plate used in batteries such as alkaline secondary batteries; and to a battery plate produced by using the metallic porous body.

2. Description of the Background Art

Alkaline secondary batteries have been widely used as a power source for various devices because they are highly reliable and can be reduced in size and weight. There are a variety of sizes from small types for portable devices to large types for industrial or large-scale equipment.

There are many types of alkaline secondary batteries have in terms of the combination of the positive and negative electrodes. While most cases, a nickel electrode is used as the positive electrode, various negative electrodes are used, such as, a cadmium electrode, a zinc electrode, an iron electrode, a hydrogen electrode, and so on. Of these, a cadmium electrode is the most common. Yet, a hydrogen electrode having a hydrogen-absorbing alloy as the active material has been the focus of attention with regard to capacity increase and pollution decrease.

Among the foregoing electrodes, the so-called "pocket type" nickel electrode was conventionally used. However, a new type of nickel electrode has been in popular use in recent years. The new type is produced by filling large quantities of particles of an active material for the positive electrode, such as nickel hydroxide, into the pores of a porous current-collecting plate made of a conductive material such as nickel. This type enables a battery to be hermetically sealed and can further improve the battery properties compared to the pocket type. Also, a cadmium electrode and a hydrogen electrode are produced by filling large quantities of active materials into the pores of a porous plate for the negative electrode, such as cadmium or hydrogen-absorbing alloy.

Formerly a sintered body of a nickel powder was used as a porous plate to be filled with an active material. However, a new type of metallic porous body has been increasingly used as the porous plate in recent years. The new type is produced by using a plastic porous body (a polyurethane foam, for example) that has a continuous-pore structure with high porosity as the core, because this type allows the filling of greater quantities of active materials compared to the sintered body, and is suitable for increasing the battery capacity.

Such a metallic porous body is usually produced by the following method:

First, conductivity is given to the plastic core by either of the following methods:

(1) The surface of the framework of the plastic core is treated with a catalyst such as palladium chloride. Next, conductivity is given onto the treated surface by electroless plating such as electroless nickel plating.

(2) A mixed-binder solution containing conductive carbon particles such as graphite is applied to the surface of the framework of the plastic core. Next, the solution is dried to complete the process of giving conductivity to the plastic core.

Second, a continuous metal-plated layer (a nickel-plated layer, for example) is formed on the surface of the conductive framework of the plastic core by electroplating with a metal (nickel, for example) with the conductive core (the conductive porous body) serving as the cathode. Finally, if necessary, the core is removed by heat treatment.

The electroless plating described in the method (1) above, however, is costly because it uses palladium, which is a noble metal. Moreover, if the palladium is admitted into the electroplating liquid, a treating liquid for the succeeding process, a rapid reducing reaction of nickel ions represented as "nickel-dust formation" occurs, consuming nearly all the nickel in the plating liquid, and which prevents further use of the liquid as a plating liquid. The term "nickel-dust formation" is used in the present invention to mean a phenomenon that nickel deposits onto palladium particles, being suspended in an electroplating liquid.

It is difficult to handle the conductive porous body produced by the method (1) above. The conductive porous body tends to increase its electrical resistance significantly when undergoing deformation during the following processes:

(a) In a continuous production system where a metallic porous body is produced continuously from the core through the conductive porous body, when the conductive porous body is supplied to the electroplating process, a process following the electroless plating, the conductive porous body is drawn longitudinally by bending or tension.

(b) When the required quantities of conductive porous bodies are grouped as a batch to be supplied to the subsequent electroplating process, the conductive porous body is wound into the form of a roll or hoop.

(c) After the required quantities of the cores wound into the form of a roll or hoop as a batch are treated in the process for obtaining conductivity, when the conductive porous body thus produced is supplied to the subsequent continuous-electroplating process, the conductive porous body is unwound from the form of a roll or hoop.

If the conductive porous body increases its electrical resistance significantly, this increase reduces the growth rate of the metal-plated layer, such as a nickel-plated layer, in the electroplating process. This rate reduction may reduce the productivity or production efficiency of the metallic porous body.

The conductive layer formed on the surface of the framework of a core by electroless plating is an extremely thin, continuous metallic film. Electroless nickel plating, for instance, produces a metallic film as thin as 0.1 µm or so. The metallic film cracks or folds easily when the conductive porous body undergoes deformation caused by the bending, drawing winding, or unwinding as described above. The cracks or folds reduce the conductivity of the conductive porous body, increasing the electrical resistance significantly as mentioned above. The result is the reduction in the growth rate of the metal-plated layer, such as a nickel-plated layer, in the electroplating process.

In order to reduce the tension applied to, the conductive porous body, for instance, a decrease in the feeding speed and an increase in the radius of curvature in bending and winding have been discussed. These solutions, however, pose new problems such as the reduction in the productivity or production efficiency of the metallic porous body and the necessity for a greater area of space for the production equipment or the facilities for material handling or storing.

Electroless nickel plating, the most popular electroless plating described in the method (1) above, has used sodium hypophosphite ($NaH_2PO_2·H_2O$) or sodium boron hydride ($NaBH_4$) as a reducing agent to deposit nickel ions in the plating liquid as a metal. Consequently, the conductive layer formed on the surface of the framework of the core is inevitably made of a nickel-phosphorus alloy or a nickel-boron alloy each of which contains several percentages of phosphorus or boron derived from the reducing agent as an impurity.

In this case, when the core is removed by heat treatment after the metal-plated layer, such as a nickel-plated layer, is formed on the conductive layer by electroplating, the foregoing impurity such as phosphorus diffuses into the metal-plated layer, increasing the electrical resistance of the metallic porous body produced. As a result, a battery having a plate made with such a metallic porous body may suffer a reduction in charging and discharging efficiency or may undergo deterioration in charging and discharging properties caused by the dissolution of the phosphorus into the electrolyte after prolonged and repeated charging and discharging.

Similarly, the conductive porous body produced by applying carbon particles on the surface of the framework of the core as described in the method (2) above, also, suffers crazing of the binder resin owing to the drawing operation in particular, increasing the electrical resistance considerably as with the conductive porous body produced by the method (1). Furthermore, the conductive porous body produced by the method (2) inherently has high electrical resistance, because carbon itself has considerably higher resistivity than metal and carbon particles are adhered onto one another with the help of a binder that has no or poor conductivity.

Consequently, the conductive porous body produced by the method (2), also, has problems of a significantly low growing rate of a metal-plated layer in the electroplating process and low productivity and production efficiency of the metallic porous body.

SUMMARY OF THE INVENTION

An object of the present invention is to offer a conductive porous body that:

(a) has a conductive layer made of nickel whose impurities are reduced to a minimum;

(b) provides a high growing rate of a metallic layer in the electroplating process, is easy to handle, maintains a practical high growing rate even when it undergoes a large magnitude of deformation, and hence is excellent in productivity and production efficiency .for producing a metallic porous body; and (c) is capable of producing an excellent metallic porous body that is low in electrical resistance.

Another object of the present invention is to offer a metallic porous body that is low in electrical resistance and enables an increase in efficiency of charge and discharge when used as a plate for batteries.

Yet another object of the present invention is to offer a battery plate that has high efficiency of charge and discharge.

In order to solve the above-described problems, the present inventors made intensive studies to find a nickel-ion-reducing substance that:

(a) has a reducing potential sufficient for reducing nickel ions;

(b)) has an extremely large ionization tendency and hence cannot be reduced by metals in an aqueous solution, so that it does not contaminate a nickel layer as an impurity metal by depositing during the electroplating process; and (c) can be re-used by restoring the original oxidation number easily even if it is oxidized by acting as a reducing agent.

The present inventors also earnestly investigated a treating method that enables high bonding strength of the foregoing conductive particles onto the surface of the framework of a core, a plastic porous body.

The present inventors obtained the following various findings as a result

[1] First, the present inventors found that in order to form a conductive layer composed of nickel particles on the surface of the framework of a plastic porous body, it is desirable to use as a reducing agent a mixture of a specific complexing agent that increases the reducing potential of titanium ions and a titanium-chloride solution containing titanium(III) chloride.

Whereas a potential difference of 0.257 V is needed to reduce a divalent nickel ion to metal nickel, a potential difference no more than 0.04 V is needed to oxidize a trivalent titanium ion included in titanium(III) chloride to a quadrivalent ion. However, the reaction of a trivalent titanium ion with a specific complexing agent increases the potential difference between trivalence and quadrivalence in titanium ions. For instance, a complexing reaction of a trivalent titanium ion with a citric acid produces a potential difference between trivalence and quadrivalence as large as more than 1 V at pH 9.0.

Although a reducing potential more than 1 V can be obtained by using sodium hypophosphite or sodium boron hydride either of which has been used as a reducing agent for nickel, sodium hypophosphite or sodium boron hydride alone cannot reduce nickel, because nickel ions in the aqueous solution are hydrated to become stable complex ions called aquo complexes. Therefore, the conventional electroless nickel plating decomposes nickel-aquo complexes through the adsorption on the surface of a palladium catalyst to produce bare nickel ions so that the reducing reaction to metal nickel is realized. Incidentally, the present inventors found no published techniques that deposit nickel directly from the aqueous solution without using a precious metal such as palladium.

On the other hand, the present invention uses a reducing agent that mixes a complexing agent such as citric acid with a titanium-chloride solution containing titanium(III) chloride. It also uses nickel(II) sulfate as a source of nickel. The nickel(II) sulfate is caused to react with ammonia in an aqueous solution to produce a nickel-ammonium aquo complex. This method of the present invention enables the reducing reaction of nickel ions and accompanying deposition of nickel particles without using an expensive, precious-metal catalyst such as palladium. According to the present invention, a significantly high-cost treating method is not required, and there is no possibility of admitting a palladium catalyst into an electroplating liquid, so that the possibility of the occurrence of the above-described "nickel-dust formation" can be eliminated. Incidentally, the present invention does not exclude the use of palladium aggressively; a palladium catalyst may be used simultaneously because of industrial reasons such as an increase in production rate.

[2] It is known that the above-mentioned titanium chloride belongs to the Ziegler-Natta catalyst as with alkylaluminum and acts as a catalyst for isometric polymerization of olefins. (To be more specific, titanium chloride forms a transition state by acting on π-electron clouds in olefins.) Based on this knowledge, the present inventors found that the adhesion of nickel onto a plastic porous body can be secured by causing the porous body to adsorb titanium chloride previously or concurrently with the reducing reaction of nickel.

[3] In addition, titanium is an element that has the third highest ionization tendency after beryllium and magnesium in alkaline earth metals, and usually, titanium ions in an aqueous solution cannot be reduced to metal titanium. Therefore, metal titanium does not contaminate a nickel layer depositing on the surface of the framework of a plastic porous body after being reduced during the electroless plating process.

[4] Sodium hypophosphite and sodium boron hydride, which have been used as a reducing agent, transform into a substance that cannot be re-used after the electroless plating process. On the other hand, the quadrivallent titanium produced during the electroless plating process using a reducing agent containing the foregoing titanium compound can be restored to the original trivalent titanium by the reduction at the cathode in the electrolysis where the anode and cathode are separated by an ion-exchange membrane in a hydrochloric acidic aqueous solution. In short, the reducing agent can be re-used by restoring its oxidation number to the original number.

[5] A catalyst is not required basically in forming a nickel layer by electroless plating when:

(a) a reducing agent is prepared by mixing a titanium-chloride solution containing titanium(III) chloride and a specific complexing agent that increases the reducing potential of titanium ions;

(b) nickel(II) sulfate is used as a source of nickel; and (c) the nickel(II) sulfate is caused to react with ammonia in an aqueous solution to produce a nickel-ammonium aquo complex.

Furthermore, the present inventors confirmed that there is no self-catalytic reaction. Hence, nickel particles that deposited earlier in the electroless plating process onto the surface of the framework of a plastic porous body remain as particles with no growth.

[6] A conductive layer comprising nickel particles forms a thin passive coating caused by the characteristic of nickel itself, and hence is stable against water and oxygen. As a result, its surface is hardly oxidized, and it maintains high conductivity (i.e., low resistance) at all times. Such a conductive layer, when the deposited quantity of nickel particles is relatively small, increases its electrical resistance at a dry condition owing to poor electrical conduction between the particles. Nonetheless, the conductive layer can form a metal-plated layer with a high growing rate in the subsequent electroplating process. This is attributable to the conductive layer, when immersed in an electroplating bath, the electrical conduction between the particles being maintained through the plating liquid that has filled the minute gaps between the particles, reducing the electrical resistance. Consequently, a metallic porous body can be produced with good productivity and high production efficiency.

It is surprising that the foregoing high growth rate hardly changes even after the conductive porous body undergoes various types of deformation as mentioned earlier. This is attributed to the deformation scarcely affecting the structure of the conductive layer and the mechanism of electrical conduction under the immersed condition in an electroplating bath.

Subsequently, the present inventors made further studies on the microscopic structure of a conductive layer made of nickel on the basis of the findings described in [1] to [6] above, and found that a conductive layer can exhibit the foregoing excellent performance when it is composed of a collection of nickel particles, thus completing the present invention.

To be more specific, in order to solve the above-mentioned technical problems, the conductive porous body of the present invention has, on the surface of the framework of a plastic porous body with a continuous-pore structure, a conductive layer composed of nickel particles caused to deposit from an aqueous solution dissolving nickel ions by virtue of a reducing agent containing titanium compounds.

In the present invention, it is desirable that the reducing agent be a mixture of titanium(III) chloride and citric acid. It is also desirable that the nickel ions be derived from nickel(II) sulfate, nickel(II) chloride, nickel carbonate, or nickel alloy. It is preferable that the nickel ions be nickel-ammonium aquo complexes produced by a reaction of nickel(II) sulfate (a starting material of nickel ions) and ammonia in an aqueous solution.

It is desirable that the conductive layer in the conductive porous body of the present invention have the following features in terms of increasing the growth rate of the metal-plated layer formed on the surface of the conductive layer:

(a) the nickel particles forming the conductive layer have an average particle diameter not less than 10 nm and not more than 300 nm; and (b) congregation of the particles gives the conductive layer uninterrupted conductivity as a whole.

In the process of nickel deposition, finer particles called primary particles first deposit. Then these primary particles congregate and constitute a secondary particle. In the present invention, the terms "particle diameter" and "average particle diameter" are used to mean the diameter and the average diameter, respectively, of the secondary particles.

It is desirable that the conductive layer contain not more than 100 ppm titanium oxide derived from a reducing agent. The conductive layer may allow titanium oxide produced as a by-product during the reducing process of nickel to mingle with as the nucleus of the nickel-layer deposition. Provided that the titanium-oxide content in a conductive layer is 100 ppm or less, the titanium oxide has practically no effect on the electrical resistance of the conductive layer. More importantly, metal titanium has practically no opportunity to contaminate the conductive layer.

The metallic porous body of the present invention has a continuous metal-plated layer (nickel-plated layer, for example) formed on the surface of the framework of the conductive porous body of the present invention by electroplating, with the conductive porous body serving as the cathode.

The metallic porous body of the present invention produced by using the conductive porous body allows trace amounts of titanium oxide produced as a by-product during the reducing process to diffuse into the metal-plated layer as an impurity, although the amount is minimal, when the plastic core is removed by heat treatment, for example. As a result, the electrical resistance increases slightly in comparison with a pure elemental metal (elemental nickel, for example). Nevertheless, the increment is extremely small in comparison with the increase in electrical resistance by the diffusion of phosphorus from the above-mentioned conventional electroless nickel-plated layer formed by using sodium hypophosphite, and gives practically no effect on the total electrical resistance of the metallic porous body.

The present invention offers a conductive porous body that has the following features:

(a) Its conductivity can be obtained without using an expensive catalyst such as palladium.

(b) It has excellent conductivity, which has no tendency to decrease by deformation such as drawing or bending.

(c) It allows a metal-plated layer to grow quickly in electroplating. (d) It enables the production of an excellent metallic porous body that is superior in productivity and production efficiency and has low electrical resistance.

The present invention also offers a metallic porous body that has low electrical resistance because it is produced by using the foregoing conductive porous body and that enables the increase in charging and discharging efficiency when used as a battery plate, for example. The metallic porous body may be produced by removing the plastic porous body by heat treatment after the formation of the metal-plated layer.

The present invention also offers a battery plate that consists mainly of the metallic porous body of the present invention. The battery plate is superior in charging and discharging efficiency because of the use of the metallic porous body.

DESCRIPTION OF THE PREFERRED EMBODIMENTS

The present invention is explained in detail below.

Conductive Porous Body

As mentioned before, the conductive porous body of the present invention forms a conductive layer composed of a collection of nickel particles on the surface of the framework of the core, a plastic porous body with a continuous-pore structure.

As mentioned before, it is desirable that the reducing agent for producing the conductive porous body be a reducing agent that contains titanium compounds, preferably a mixture of a complexing agent and a titanium-chloride solution containing titanium(III) chloride.

Among titanium ions, only trivalent ions act as a reducing agent. When only trivalent ions are dissolved in an aqueous solution, hydrolysis occurs and forms precipitation through titanium hydroxide. However, when quadrivalent titanium is mixed with trivalent titanium with a ratio of 4% or more: 100%, the formation of precipitation can be suppressed by the stabilizing effect produced by the mutual ion exchange between trivalence and quadrivalence.

The foregoing complexing agent can be a carboxylic derivative such as a citric acid or an ethylenediaminetetraacetic acid (EDTA).

It is desirable to use nickel(II) sulfate, for instance, as an aqueous solution containing nickel ions, or a source of nickel, for producing a conductive porous body.

Nickel(II) chloride may be used in place of nickel(II) sulfate. However, it was observed that nickel(II) chloride decreases the reducing rate, or the depositing rate, of nickel significantly. A similar reduction in the depositing rate was observed when a dilute hydrochloric acid was used at the time pH adjustments of a plating liquid were carried out. Consequently, it can be said that the addition of excessive amounts of chlorine ions into a plating liquid effects the reduction in the reaction rate. To conclude, when nickel(II) chloride is used as a nickel source, sufficient care must be taken in adjusting the concentration of chlorine ions.

The present invention can produce nickel particles by using a reducing agent made of a mixture of a complexing agent, such as citric acid, and a titanium-chloride solution containing titanium(III) chloride and by using a source of nickel made of a nickel-ammonium aquo complex produced by the reaction of nickel(II) sulfate, for example, as a starting substance and ammonia in an aqueous solution.

This is because the nickel that deposited at the early stage remains as nickel particles without growing because no catalyst is used as mentioned before and no self-catalytic reaction exists. The nickel particles produced usually have a particle diameter of 10 to 300 nm or so depending on the pH and temperature conditions.

In the present invention, it is desirable to control the pH and temperature conditions so that the nickel particles have an average particle diameter not less than 10 nm and not more than 300 nm, more desirably from 100 to 300 nm, preferably from 100 to 200 nm.

Congregation of particles having a particle diameter lying in the above-specified range gives uninterrupted conductivity as a whole to the conductive layer formed on the surface of the framework of a plastic porous body with a continuous-pore structure.

When the nickel is depositing, no titanium contaminates the nickel layer as metal titanium; however, titanium oxide produced as a by-product during the reducing process mingles with the nickel layer in minimal amounts as the nucleus of the nickel deposition. Hence, the nickel that forms the conductive layer includes titanium oxide derived from titanium compounds in amounts of 100 ppm or less depending on, the particle diameter of depositing particles. Nevertheless, the titanium oxide neither forms an alloy with the mother layer nickel nor decreases the conductivity of the nickel.

In the present invention, in addition to the foregoing reducing agent, complexing agent, and nickel source, additives such as a pH-controlling agent (a pH buffer) and a nickel stabilizer may be added into the plating liquid for forming the conductive layer of the conductive porous body.

Such a pH-controlling agent can be boric acid, ammonium borate, or ammonium.

Of these, it is desirable that boric acid and ammonium borate have a concentration of 0.001 to 0.2 M (mol/L). If less than 0.001 M, the pH-stabilizing effect becomes insufficient. If more than 0.2 M, boric acid or ammonium borate may undesirably deposit.

As the foregoing nickel stabilizer, the following materials may be used:

(a) metal ions, such as lead (Pb) ions or a combination of lead (Pb) ions and at least one type of metal ion selected from the group consisting of tin (Sn), arsenic (As), thallium (Tl), molybdenum (Mo), and gallium (Ga) ions;

(b) iodide such as potassium iodate ($KI_3O$); and (c) sulfide such as thiourea.

Core

As the core, various types of well-known plastic porous bodies with a continuous-pore structure can be used.

These types include foamed bodies having a three-dimensional network with a continuous-pore structure throughout the body and nonwoven or woven fabrics made of plastic fibers.

More specifically, the types of foamed bodies include a polyurethane foam, a melamine-resin foam, and other foamed bodies made of thermoplastic resins such as polystyrene, polyethylene, and polyvinyl chloride.

Similarly, the types of plastic fibers constituting the foregoing nonwoven or woven fabrics include various well-known plastic fibers such as polyethylene, polyester, polypropylene, and nylon fibers.

When a metallic porous body produced by using the conductive porous body of the present invention is used as a plate for an alkaline secondary battery without removing the core as mentioned below, the core is required to have excellent alkali resistance because it must have excellent resistance to an extreme alkali of the alkaline electrolyte. To be more specific, it is desirable for the core to obtain the evaluation of G (Good) or higher, preferably E (Excellent), against an extreme alkali of pH 11 or more, which corresponds to the alkaline electrolyte, in the chemical resistance test specified in the standard of American Society for Testing and Materials ASTM D543-63T.

As a core superior in alkali resistance, it is desirable to use a porous body formed of polyolefin such as polyethylene and polypropylene. An example of such a porous body is produced by the following method, although no restriction is given by this example: First, short polyolefin fibers having a diameter of about 10 to 40 $\mu$m or so are prepared. Second, a nonwoven fabric is produced by bonding intersections of the short polyolefin fibers so that the fabric has an average pore diameter of about 0.6 mm or less. Finally, the nonwoven fabric is drawn unidirectionally. (An example of this type is made by Hitachi Chemical Co., Ltd. with the brand name "RF-30.")

On the other hand, when a metallic porous body produced by using the conductive porous body of the present invention is the one in which the core is removed as described below or when the metallic porous body is used for applications other than a plate of alkaline secondary batteries even with the core remaining, the core need not have the above-mentioned high resistance to alkalies. In this case, therefore, it is desirable to use a general-purpose porous body such as a polyurethane foam in terms of easy removal by heat treatment and low manufacturing costs.

The core may have an appropriate thickness, an average pore diameter, and porosity in accordance with the applications of the metallic porous body.

Conductive Layer

A conductive layer formed on the surface of the framework of the core is required to be formed by a collection of nickel particles as mentioned before. The nickel particles have no specific limitations on the size. As described before, however, it is desirable to reduce the particle diameter as much as possible in order to increase the growth rate of the metal-plated layer in the electroplating process. This increase in the growth rate is attributed to the nickel particles, when decreasing their particle diameter, the gaps between the particles becoming small, and the metal layer filling the gaps by electroplating increasing its function of maintaining the electrical conduction between the particles.

Although the nickel particles have no specific limitations on the range of particle diameter as mentioned above, when the nickel particles have an average particle diameter of 300 nm or less, the growth rate of the metal-plated layer in the electroplating process can be increased as shown in the results of Examples below. Although the range of the average particle diameter has no specific upper limit, it is desirable for the average particle diameter to have a maximum value of 300 nm or so.

If the nickel particles have an average particle diameter of 10 nm or less as mentioned earlier, the conductive layer is composed of several atoms of nickel rather than nickel particles. As a result, the nickel oxide existing on the surface of the particles increases its effects and tends to decrease the conductivity of the conductive layer.

In the above-described range, it is more desirable that the nickel particles have an average particle diameter of 100 to 300 nm, preferably 100 to 200 nm.

The conductive layer has no specific limitations on the thickness in the present invention. Nonetheless, when the thickness is represented by a coated amount (g) of nickel per square meter of an ordinary core having a thickness of 1.4 to 1.8 mm and a porosity of 97 to 98%, it is desirable that the conductive layer have a coated amount of 1 to 7 $g/m^2$.

If the conductive layer has a coated amount less than the above-described range, sufficient conductivity cannot be given to the core. Consequently, the growing rate of the metal-plated layer may decrease in the electroplating process.

In the above-described range of the coated amount, it is more desirable that the conductive layer have a coated amount of 2 to 5 $g/m^2$ in terms of the balance between the conductivity and the cost of nickel plating.

Metallic Porous Body

Next is an explanation of the metallic porous body of the present invention.

As described earlier, the metallic porous body is produced by forming a continuous metal-plated layer on the surface of the framework of the conductive porous body of the present invention by electroplating, with the conductive porous body serving as the cathode. The metal-plated layer is composed of one or more types of metals and may comprise single or more layers.

A nickel-plated layer having a single-layer structure, for example, is formed by electroplating in such a manner that the cathode made of the conductive porous body and the anode made of an appropriate nickel plate are immersed in a nickel-electroplating bath with voltage applied across the electrodes.

Because a metal-plated layer has only to be formed of a metal (nickel, for example) needed as a plate at least at the outermost layer, a plural-layer structure may be formed by laminating a plated layer of nickel, for example, on the surface of a substrate comprising one or more plated layers of less expensive metals or metals that are easy to form.

The metal-plated layer has no specific limitations on the thickness in the present invention. Nevertheless, considering the strength and electrical resistance of the metal-plated layer, it is desirable that the metal-plated layer have a thickness of 5 to 30 $\mu$m or so, preferably 5 to 10 $\mu$m or so.

In this case, the thickness represents the thickness of the metal-plated layer itself for a single-layer structure and the total thickness of the individual metal-plated layers for a plural-layer structure.

The metallic porous body of the present invention may be produced by removing the core by heat treatment as mentioned before.

The core is removed after the metal-plated layer is formed. First, the whole of the metallic porous body is heat-treated in air so that the plastic resin is oxidized and decomposed thermally. Next, the pretreated body is heat-treated in a non-oxidative atmosphere such as hydrogen gas in order to reduce the oxidized and passivated metal-plated layer. Each of the heat treatments may be carried out at a temperature as high as about 1000° C. to remove the core completely. (Heating may be continued until no carbon is detected that derives from the plastic resin that constitutes the core.)

In this case, the conventional electroless-nickel-plated layer poses a problem of the increase in the electrical resistance of the metallic porous body, because the phosphorus included in the conductive layer diffuses into the metal-plated layer. On the contrary, in the metallic porous body of the present invention, practically no metal titanium contaminates the conductive layer as mentioned before. Moreover, the amount of titanium oxide that contaminates the conductive layer is not more than 100 ppm. Accordingly, the metallic porous body is free from the problem of an increase in electrical resistance.

In short, the metallic porous body of the present invention is produced by causing the conductive porous body of the present invention as an intermediate material, and hence it has low electrical resistance. Accordingly, it exhibits excellent characteristics such as to increase the charging and discharging efficiency when used as a battery plate. In addition to a battery plate, the metallic porous body of the present invention may be used for the following various applications, for instance:

(a) a carrier for various catalysts;
(b) a member for various space heaters, such as a member for gasifying or atomizing the heating oil and a burner-port plate for the gas;
(c) a silencer for engines and pneumatic apparatus;
(d) an oil-mist separator;
(e) a member for catching the soot in the exhaust gas of diesel engines, for example;
(f) a member for shielding electromagnetic waves;
(g) various filters;
(h) pistons of diesel engines, for example; and
(i) wear-resistant parts in hydraulic apparatus.

Battery Plate

Next is an explanation of the battery plate of the present invention.

The battery plate consists mainly of the metallic porous body of the present invention. To be specific, the metallic porous body produced by electroplating with the conductive porous body of the present invention serving as the, cathode is used as a battery plate in the as-produced condition or after removing the core by heat treatment as mentioned before.

It is desirable that the metallic porous body as a battery plate have a porosity of about 50% or more.

If the porosity is less than the above range, this decreases the filled amount of active material that can be retained in the pores of the continuous-pore structure, and the battery may not be increased in the capacity.

In the foregoing range, it is more desirable that the porosity be 98% or less. If the porosity exceeds this range, the metallic porous body loses its strength considerably as a whole and may not be used as a plate. Within the foregoing range, it is preferable that the porosity be 90 to 93% or so in terms of the combination of the above-mentioned various properties.

The plate of the present invention consists mainly of the metallic porous body of the present invention as mentioned above, and hence is superior in charging and discharging efficiency and suitable for the above-mentioned alkaline secondary battery, for example. It is especially suited for a plate of nickel—metal hydride secondary batteries that have been a target of development as the power-supply battery for hybrid cars, electric cars, and so on and that are required to supply a heavy current of about 100 A with a size of a "D" cell.

The battery plate of the present invention may be used for various batteries in addition to an alkaline secondary battery.

EXAMPLES

The present invention is explained by Examples and Comparative Examples below.

Example 1

A polyurethane foam with a continuous-pore structure having a thickness of 1 mm, an average pore diameter of 0.45 mm, and a porosity of 98% was used as the core. The core was rinsed with water at 60° C. to remove all dirt.

A total volume of two liters of a plating liquid was prepared by mixing one liter each of a reducing liquid (1) and a nickel solution (1) immediately before the depositing reaction as shown in Table 1.

TABLE 1

| Constituent | Ingredient | Content (mM) |
| --- | --- | --- |
| Reducing liquid (1) | Sodium citrate dihydrate | 100 |
| | 20% titanium(III) chloride solution | 100 |
| | 16% titanium(IV) chloride solution | 0 |
| Nickel solution (1) | Nickel(II) sulfate hexahydrate | 200 |
| | Sodium citrate dihydrate | 200 |

*: The pH was controlled to 9.0 with dilute sulfuric acid or a 25% ammonia solution.
**: The unit of content "mM" means $1 \times 10^{-3}$ mol/L.

The plating liquid was controlled to pH 9.0 by adding dilute sulfuric acid or a 25% ammonia solution. The core was immersed in the plating liquid at 50 to 60° C. for 30 minutes to obtain a conductive porous body having a conductive layer with a coated amount of 1 g/m$^2$.

Observations of the obtained conductive porous body with an SEM confirmed that a conductive layer made of a collection of nickel particles is formed on the surface of the framework of the core. The average particle diameter of the nickel particles was determined by using all the particles existing in a micrograph (dimension: 10×13.5 cm) taken with the SEM at 20,000 power. The average particle diameter is 100 nm. Some of the smallest particles have a particle diameter of 10 to 12 $\mu$m. There are no particles that have a particle diameter more than 180 nm.

Figure 1:
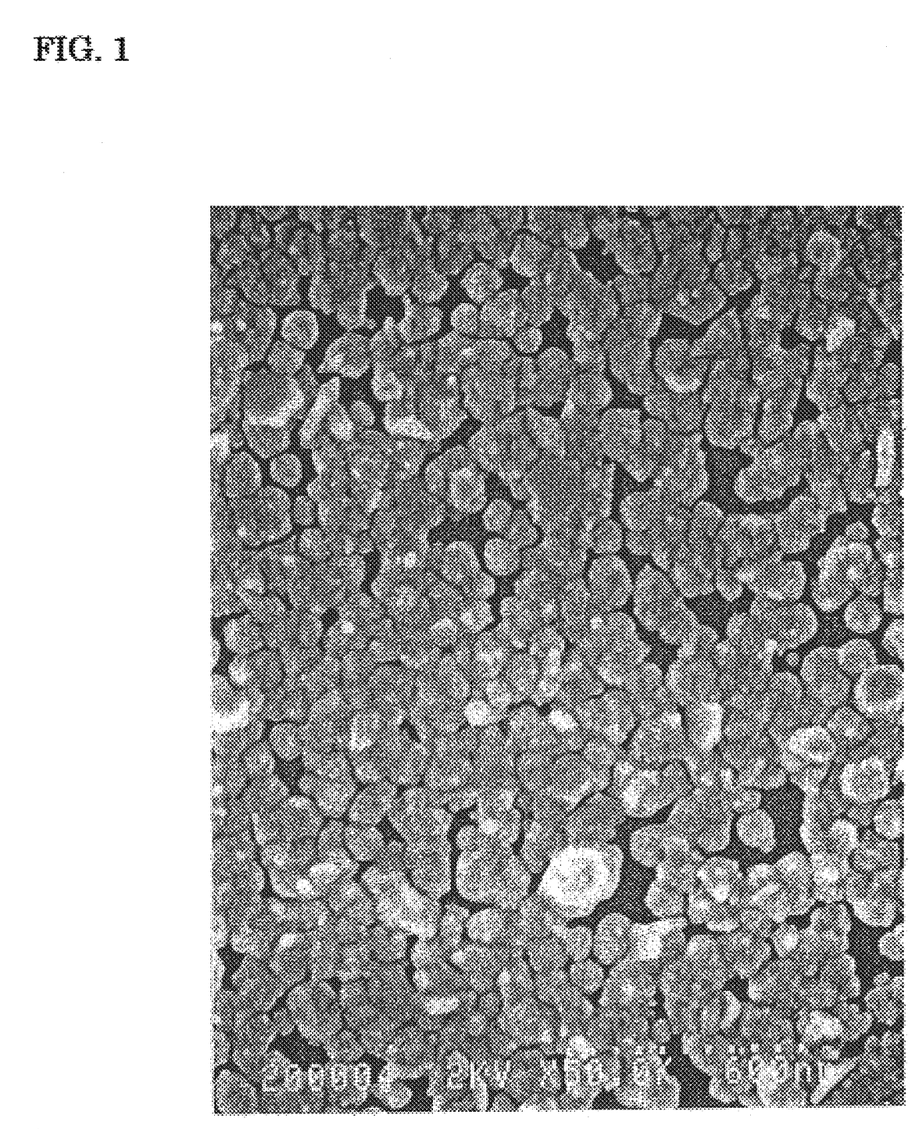
FIG. 1 is a micrograph taken with a scanning electron microscope (SEM) at 20,000 power showing a conductive layer obtained in Example 1.

FIG. 1 is a micrograph taken with an SEM at 20,000 power showing the conductive layer obtained in Example 1.

Example 2

A total volume of two liters of a plating liquid was prepared by mixing one liter each of a reducing liquid (2) and a nickel solution (2) immediately before the depositing reaction as shown in Table 2.

TABLE 2

| Constituent | Ingredient | Content (mM) |
| --- | --- | --- |
| Reducing liquid (2) | Sodium citrate dihydrate | 200 |
| | 20% titanium(III) chloride solution | 200 |
| | 16% titanium(IV) chloride solution | 8 |
| Nickel solution (2) | Nickel(II) sulfate hexahydrate | 200 |
| | Sodium citrate dihydrate | 200 |

*: The pH was controlled to 9.0 with dilute sulfuric acid or a 25% ammonia solution.
**: The unit of content "mM" means $1 \times 10^{-3}$ mol/L.

The plating liquid was controlled to pH 9.0 by adding dilute sulfuric acid or a 25% ammonia solution. The same core as used in Example 1 was immersed in the plating liquid at 50 to 60° C. for 15 minutes.

One liter of the reducing liquid (2) was further added into the plating liquid gradually. The plating liquid was controlled to pH 9.0 by adding a 25% ammonia solution. The core was successively immersed in the plating liquid at 50 to 60° C. for 15 minutes. Thus a conductive porous body having a conductive layer with a coated amount of 5 g/m$^2$ was obtained.

Observations of the obtained conductive porous body with an SEM confirmed that a conductive layer made of a collection of nickel particles is formed on the surface of the framework of the core. The average particle diameter of the nickel particles was determined by using al the particles existing in a micrograph (dimension: 10×13.5 cm) taken with the SEM at 20,000 power. The average particle diameter is 120 nm. Some of the smallest particles have a particle diameter of 10 to 12 μm. There are no particles that have a particle diameter more than 300 nm.

Figure 2:
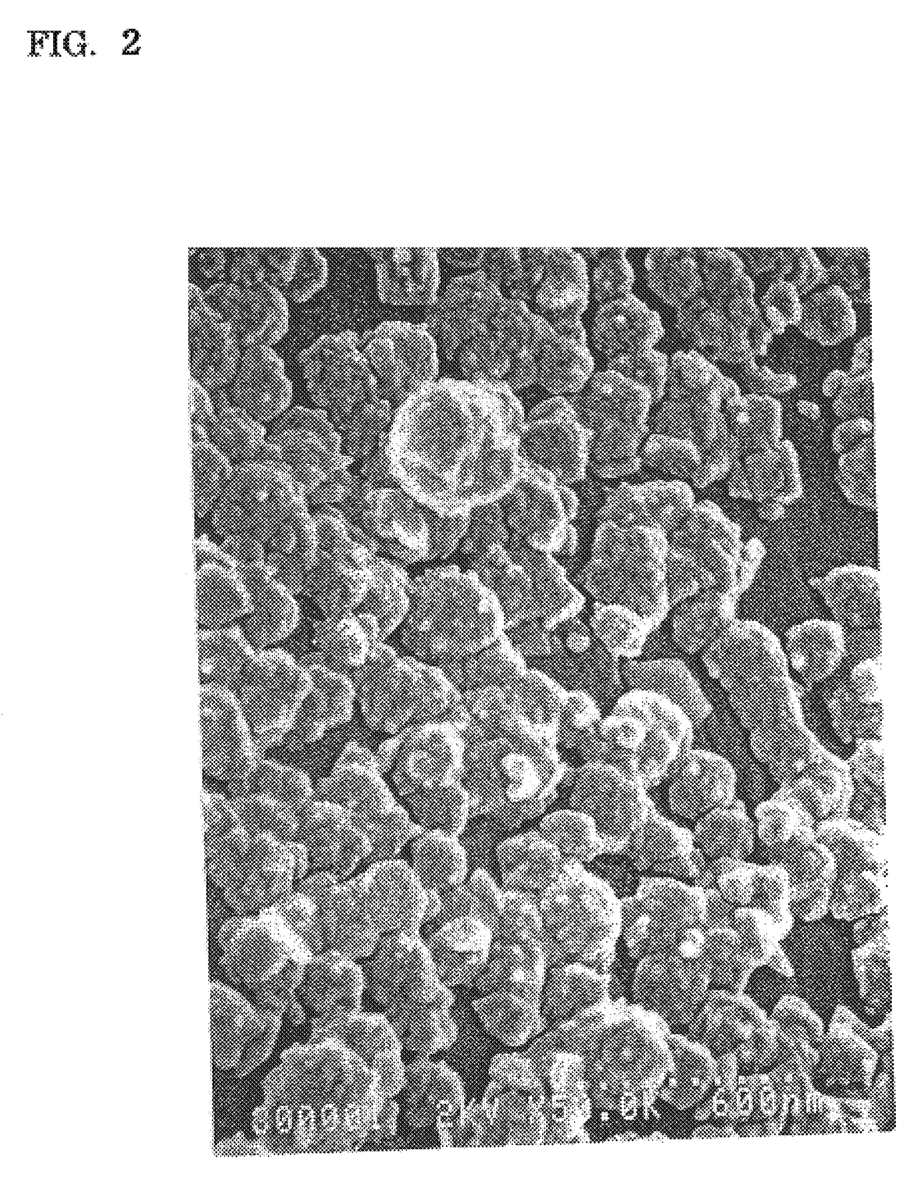
FIG. 2 is a micrograph taken with an SEM at 20,000 power showing a conductive layer obtained in Example 2.

FIG. 2 is a micrograph taken with an SEM at 20,000 power showing the conductive layer obtained in Example 2.

Example 3

A total volume of two liters of a plating liquid was prepared by mixing A, B, and C liquids shown in Table 3.

TABLE 3

| Constituent | Ingredient | Concentration |
| --- | --- | --- |
| A liquid | Nickel(II) sulfate | 0.04 M |
| | Trisodium citrate | 0.2 M |
| | Nitrilotriacetic acid trisodium salt | 0.04 M |
| | Stabilizer * | 40 mL/L |
| B liquid | Titanium(IV) chloride | 0.04 M |
| | Trisodium citrate | 0.04 M |
| | Ammonia | 11 mL/L |
| C liquid | Titanium(III) chloride | 0.04 M |
| | Ammonium borate | 0.05 M |

*: A stabilizer comprising lead compounds, iodides, and sulfides was used.
**: The unit of content "M" means mol/L.

The plating liquid was heated to 50° C. and controlled to pH 8.4 to 8.6 by adding ammonia.

The same core as used in Example 1 was caused to adsorb a palladium catalyst previously. The treated core was immersed in the plating liquid at 50 to 60° C. for 15 minutes. Thus a conductive porous body having a conductive layer with a coated amount of 3 g/m$^2$ was obtained.

Observations of the obtained conductive porous body with an SEM revealed that the conductive layer formed on the surface of the framework of the core is made of a collection of nickel particles, in which primary particles with a particle diameter of 3 to 10 nm constitute secondary particles having an average particle diameter of 30 nm.

Comparative Example 1

A treatment liquid was prepared by adding a surface-active agent into a 10% sulfuric-acid solution with a proportion of 1 g/L. The same core as used in Example 1 was immersed in the treatment liquid at 60° C. to undergo acid cleaning.

The core was water-washed and then immersed in a sensitizing liquid (a palladium chloride—tin chloride mixed solution) at 40° C. for one minute. Thus the surface of the framework of the core was sensitized. The concentration of the individual constituents of the sensitizing liquid is shown in Table 4.

The sensitized core was water-washed and immersed in an electroless nickel-plating bath at 60° C. for 5 minutes. Thus a conductive porous body having a conductive layer with a coated amount of 10 g/m$^2$ was obtained. The concentration of the individual constituents of the electroless nickel-plating bath is also shown in Table 4.

TABLE 4

| Constituent | Ingredient | Concentration |
| --- | --- | --- |
| Sensitizing liquid (palladium chloride—tin chloride mixed solution) | Palladium chloride | 0.2 g/L |
| | Tin chloride | 20 g/L |
| | Hydrochloric acid(35 vol. %) | 200 mL/L |
| Electroless nickel-plating bath | Nickel(II) sulfate hexahydrate | 20 g/L |
| | Sodium acetate monohydrate | 5 g/L |
| | Sodium hypophosphite | 10 g/L |
| | Sodium citrate dihydrate | 5 g/L |
| | Lactic acid | 3 mL/L |

Observations of the obtained conductive porous body with an SEM at 20,000 power confirmed that the conductive layer formed on the surface of the framework of the core is made of a continuous film of nickel—4% phosphorus alloy, although some particles show growth.

Figure 3:
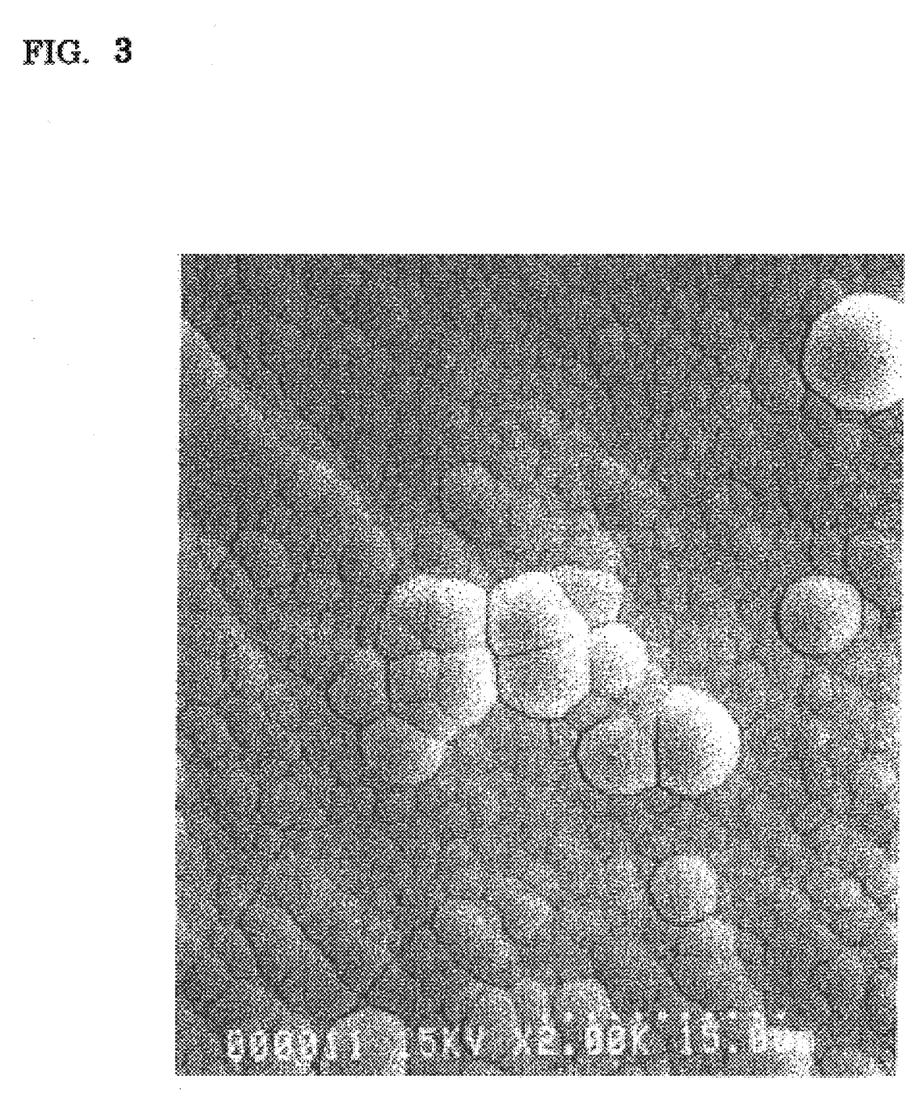
FIG. 3 is a micrograph taken with an SEM at 20,000 power showing a nickel—4% phosphorus alloy produced in Comparative Example 1.

FIG. 3 is the micrograph taken with an SEM at 20,000 power showing the conductive layer obtained in Comparative Example 1.

Comparative Example 2

An alcohol solution was prepared by dissolving polyvinyl alcohol and phenolic resin with a weight ratio of 7:3. A coating liquid was prepared by dispersing graphite particles with an average particle diameter of 0.8 μm into the alcohol solution so as to obtain a concentration of 100 g/L.

The coating liquid was spray-painted onto both surfaces of the same core as used in Example 1. The core was then dried at 100° C. to obtain a conductive porous body having a conductive layer with a coated amount of 20 g/m$^2$.

Evaluation of Properties

Measurements and tests were carried out as shown below to evaluate the properties of the conductive porous bodies obtained in Examples and Comparative Examples.

Measurement of Electrical Resistance (No. 1) (Initial Value)

Rectangular samples having a width of 1 cm and a length of 10 cm were cut from the individual conductive porous bodies obtained in Examples and Comparative Examples. The longitudinal resistance (Ω) was measured across the sample under dry conditions.

Measurement of Electrical Resistance (No. 2)
(After Drawing)

Conductive porous bodies obtained in Examples and Comparative Examples were drawn unidirectionally by 10%. After the tension was released, rectangular samples having a width of 1 cm and a length of 10 cm were cut from the conductive porous bodies in such a manner that the longitudinal direction of the sample coincided with the drawing direction. The longitudinal resistance (Ω) was measured across the sample under dry conditions.

Measurement of Electrical Resistance (No. 3)
(After Bending)

Rectangular samples having a width of 1 cm and a length of 10 cm were cut from the individual conductive porous bodies obtained in Examples and Comparative Examples. The samples were subjected to a bending test at 180° C., in which the samples were bent along a round bar having a radius of 6 cm. After the samples were unbent and cooled down, the longitudinal resistance (Ω) was measured across the sample under dry conditions.

Growth Test of Metal-Plated Layer

Rectangular samples having a width of 10 cm and a length of 30 cm were cut from the individual conductive porous bodies obtained in Examples and Comparative Examples. A pair of copper tools were attached to grasp a longitudinal end of the sample across the width. A weight made of polyvinyl chloride was attached to the other end. The sample was vertically immersed in a nickel-plating bath at 45° C. in such a manner that only the copper tools were above the liquid surface and the sample was held vertical by the weight at the bottom. The concentration of the individual constituents of the nickel-plating bath is shown in Table 5.

TABLE 5

| Constituent | Ingredient | Concentration |
| --- | --- | --- |
| Nickel-plating bath | Nickel sulfamate | 450 g/L |
| | Boric acid | 30 g/L |

A platinum electrode was placed under the weight in the nickel-plating bath. Nickel plating was carried out at a current density of 10 A/dm$^2$, with the copper tools connected to the negative terminal of the power source, and the platinum electrode to the positive terminal.

Visual observations were conducted to measure the growing rate (cm/min) of the nickel-plated layer on the surface of the sample from the liquid surface side toward the opposite end where the weight was attached.

The tests were carried out on the samples sampled from the individual conductive porous bodies obtained in Examples and Comparative Examples. The samples were subjected to the tests in the following three different states:
  (a) in the initial state without undergoing any deformation (initial state);
  (b) after the above-mentioned drawing (after drawing); and
  (c) after the above-mentioned bending (after bending).

Production of Metallic Porous Body and Measurement of Its Electrical Resistance

This test also was carried out on the samples sampled from the individual conductive porous bodies obtained in Examples and Comparative Examples. The samples in the initial state without undergoing any deformation were first subjected to the measurement of the growth rate of the nickel-plated layer as in the previous section "growth test of metal-plated layer." Then, nickel electroplating was conducted in succession on the samples under the same conditions as before.

Thus, a nickel-plated layer with a coated amount of 600 g/m$^2$ was formed on the surface of the framework of each sample of a conductive porous body. The sample was heat-treated in an atmosphere of air at 900° C. for five minutes and successively in a reducing atmosphere at 900° C. for 30 minutes to remove the core, a polyurethane foam. Thus, a metallic porous body was obtained.

Rectangular samples having a width of 1 cm and a length of 10 cm were cut from the individual metallic porous bodies thus obtained. The longitudinal resistance (Ω) was measured across the sample under dry conditions.

Results of Tests and Measurements

The results of the tests and measurements are shown in Tables 6 and 7.

TABLE 6

| | Conductive layer | | Electrical resistance of conductive porous body (Ω) | | |
| --- | --- | --- | --- | --- | --- |
| | Coated amount (g/m$^2$) | Average particle diameter (nm) *1 | Initial value | After drawing | After bending |
| Example 1 | 1 | 100 | 100–150 | 120–150 | 100–150 |
| Example 2 | 5 | 120 | 40–60 | 50–60 | 40–60 |
| Example 3 | 3 | 30 | 1–10 | 50–60 | 20–40 |
| Comparative Example 1 | 10 | Continuous film | 80–100 | ∞ | 300–5,000 |
| Comparative Example 2 | 20 | — *2 | 5,000–6,000 | 10,000 | 6,000–7,000 |

*1: The average particle diameter of nickel particles.
*2: The average particle diameter of the graphite particles that constitute the conductive layer is 0.8 μm.

TABLE 7

| | Growth rate of nickel-plated layer (cm/min) | | | Electrical resistance of metallic porous body (Ω) |
| --- | --- | --- | --- | --- |
| | Initial state | After drawing | After bending | |
| Example 1 | 25 | 25 | 25 | 20 |
| Example 2 | 40 | 40 | 40 | 20 |
| Example 3 | 40 | 40 | 40 | 20 |
| Comparative Example 1 | 30 | No growth | 18 | 40 |
| Comparative Example 2 | 10 | No growth | 12 | 28 |

As can be seen in Tables 6 and 7, Examples 1 to 3 exhibit low electrical resistance in every conductive porous body. Even the results after drawing or bending show sufficiently low electrical resistance. The growth rate of the nickel-plated layer is high. The metallic porous body has low electrical resistance. Example 3, in which a nickel catalyst was concurrently used, particularly has a smaller average particle diameter of nickel particles that have deposited. This smaller particle diameter resulted in the production of a conductive porous body that has lower electrical resistance in the initial state and after the bending as well.

On the contrary, Comparative Example 1, in which the conductive layer was formed in the conventional electroless-plating bath, produced a conductive layer made of a continuous nickel film rather than a conductive layer composed of nickel particles. Consequently, although the conductive porous body had sufficiently low electrical resistance in the initial state, the continuous film was a cracked and folded by drawing or bending. As a result, the bending caused the electrical resistance to increase exceedingly. The drawing deprived the conductive layer of the conductivity, so that no nickel-plated layer grew in the subsequent electroplating process.

Comparative Example 2, in which the conductive layer was formed by applying a mixed-binder solution containing carbon particles, had a conductive porous body high in electrical resistance even in the initial state. After the drawing, no nickel-plated layer grew in the subsequent electroplating process.

What is claimed is:

1. A conductive porous body comprising:
   (a) a plastic porous body having a continuous-pore structure formed by a framework; and
   (b) a nickel conductive layer formed on the surface of the framework of the plastic porous body by the deposition of nickel from an aqueous solution containing nickel ions with the use of a reducing agent containing titanium compounds, wherein (a) the nickel that constitutes the conductive layer is particles having an average particle diameter not less than 10 nm and not more than 300 nm; and
   (b) the conductive layer exhibits uninterrupted conductivity as a whole.

2. The conductive porous body as defined in claim 1, wherein the reducing agent is a mixture of titanium(III) chloride, titanium(IV) chloride, and citric acid.

3. The conductive porous body as defined in claim 1, wherein the nickel ions derive from at least one type selected from the group consisting of nickel(II) sulfate, nickel(II) chloride, nickel carbonate, and nickel alloy.

4. The conductive porous body as defined in claim 1, wherein the nickel ions are nickel-ammonium aquo complexes.

5. The conductive porous body as defined in claim 1, wherein the conductive layer contains not more than 100 ppm titanium.

6. The conductive porous body as defined in claim 1, wherein the plastic porous body is made of a polyurethane foam.

7. A metallic porous body comprising:
   (a) a conductive porous body defined in claim 1; and
   (b) a continuous metal-plated layer formed on the surface of the framework of the conductive porous body by electroplating with the conductive porous body serving as the cathode.

8. The metallic porous body as defined in claim 7, wherein the metal-plated layer is a nickel-plated layer.

9. A metallic porous body wherein the plastic porous body in the metallic porous body defined in claim 7 is removed by heat treatment.

10. A battery plate consisting mainly of a metallic porous body as defined in claim 7.

11. A battery plate consisting mainly of a metallic porous body as defined in claim 8.

12. A battery plate consisting mainly of a metallic porous body as defined in claim 9.

13. A method of manufacturing a conductive porous body, the method comprising:
    providing a plastic porous body having a continuous-porous structure formed by a framework; and
    depositing nickel from an aqueous solution containing nickel ions employing a reducing agent containing titanium compounds to form a nickel conductive layer on the surface of the framework.

14. The method according to claim 13, wherein the reducing agent is a mixture of titanium (III) chloride, titanium (IV) chloride, and citric acid.

15. The method according to claim 13, wherein the nickel ions derive are derived from at least one member selected from the group consisting of nickel (II) sulfate, nickel (II) chloride, nickel carbonate and a nickel alloy.

16. The method according to claim 13, the nickel ions are nickel-ammonium aquo complexes.

* * * * *